US010443742B2

(12) United States Patent
Hostetter et al.

(10) Patent No.: US 10,443,742 B2
(45) Date of Patent: Oct. 15, 2019

(54) PACKING APPARATUS AND RELATED METHODS TO IDENTIFY PROPER LOADING FOR VALVE PACKING

(71) Applicant: Fisher Controls International LLC, Marshalltown, IA (US)

(72) Inventors: Steven Keith Hostetter, Coffax, IA (US); Wesley Tyrel Ohrt, Ankeny, IA (US)

(73) Assignee: Fisher Control International LLC, Marshalltown, IA (US)

( * ) Notice: Subject to any disclaimer, the term of this patent is extended or adjusted under 35 U.S.C. 154(b) by 0 days.

(21) Appl. No.: 15/800,977

(22) Filed: Nov. 1, 2017

(65) Prior Publication Data
US 2019/0128429 A1    May 2, 2019

(51) Int. Cl.
| F16K 3/24 | (2006.01) |
| F16K 27/04 | (2006.01) |
| F16K 3/02 | (2006.01) |
| F16K 41/02 | (2006.01) |
| F16J 15/18 | (2006.01) |

(52) U.S. Cl.
CPC ............ *F16K 3/243* (2013.01); *F16J 15/186* (2013.01); *F16K 3/0227* (2013.01); *F16K 27/041* (2013.01); *F16K 41/02* (2013.01)

(58) Field of Classification Search
CPC ...... F16K 3/243; F16K 3/0227; F16K 27/041; F16K 41/02; F16J 15/186
USPC ........... 251/214, 318; 137/559; 277/522–523
See application file for complete search history.

(56) References Cited

U.S. PATENT DOCUMENTS

| 734,633 A | | 7/1903 | Titus | |
| 1,573,108 A | | 2/1926 | Willston | |
| 2,903,281 A | * | 9/1959 | Avery | F16J 15/20 |
| | | | | 277/530 |
| 4,256,317 A | * | 3/1981 | Havens | F16K 41/02 |
| | | | | 277/535 |
| 4,363,465 A | * | 12/1982 | Morrill | F16K 41/04 |
| | | | | 251/214 |
| 4,826,181 A | * | 5/1989 | Howard | F16J 15/20 |
| | | | | 277/539 |
| 5,129,625 A | * | 7/1992 | Wood | F16J 15/186 |
| | | | | 277/522 |
| 5,190,264 A | * | 3/1993 | Boger | F16J 15/186 |
| | | | | 277/522 |

(Continued)

FOREIGN PATENT DOCUMENTS

| CA | 2038124 | 9/1991 |
| JP | S6430973 | 2/1989 |

OTHER PUBLICATIONS

Merson, Fisher™ GX Control Valve and Actuator System, D103171X012, Aug. 2017, 28 pages.
(Continued)

*Primary Examiner* — John Bastianelli
(74) *Attorney, Agent, or Firm* — Hanley, Flight & Zimmerman, LLC

(57) ABSTRACT

An apparatus to identify proper loading for valve packing includes a packing follower for a fluid control valve. The packing follower has a cavity to receive a spring and at least a portion of a packing spacer. The apparatus also includes a first aperture disposed on an outer surface of the packing follower extending to the cavity to expose a portion of the spring.

25 Claims, 7 Drawing Sheets

(56) References Cited

U.S. PATENT DOCUMENTS

| | | | | |
|---|---|---|---|---|
| 5,316,319 | A | * | 5/1994 | Suggs ............... F16J 15/186 251/214 |
| 5,503,406 | A | * | 4/1996 | Armstrong .......... F16J 15/186 277/522 |
| 5,791,629 | A | * | 8/1998 | Wears ............... F16K 41/02 251/214 |
| 6,866,244 | B2 | * | 3/2005 | Wears ............... F16K 41/04 251/214 |
| 7,753,339 | B2 | * | 7/2010 | Yuzawa ............. F16K 41/02 251/214 |
| 2007/0164247 | A1 | | 7/2007 | Yuzawa et al. |
| 2009/0309059 | A1 | | 12/2009 | McCarty et al. |

OTHER PUBLICATIONS

International Searching Authority, "Written Opinion", issued in connection with International Application No. PCT/US2013/056410 dated Jan. 30, 2019, 9 pages.

International Searching Authority, "International Search Report", issued in connection with International Application No. PCT/US2018/056410 dated Jan. 30, 2019, 6 pages.

* cited by examiner

PACKING APPARATUS AND RELATED METHODS TO IDENTIFY PROPER LOADING FOR VALVE PACKING

FIELD OF THE DISCLOSURE

This disclosure relates generally to fluid valves and, more particularly, to packing apparatus and related methods for use with fluid valves.

BACKGROUND

Process control systems employ fluid control valves to regulate process fluids, such as water, natural gas, oil, etc. A fluid valve typically controls flow of a process fluid by moving (e.g., via an actuator) a valve plug or other fluid flow control member. For example, a sliding stem fluid valve may be coupled to an actuator (e.g., a pneumatic actuator) to cause a valve stem to move in and out of a valve bonnet, thereby causing a valve plug positioned within the fluid valve to increase and/or decrease a flow of the fluid through the valve. To avoid leaks and/or undesired changes in fluid pressure that may be caused by moving valve components (e.g., a valve stem), fluid control valves (e.g., a sliding stem fluid valve, a rotary fluid valve, etc.) are typically implemented with a valve packing, such as a low friction graphite material.

SUMMARY

An apparatus disclosed herein includes a packing follower for a fluid control valve. The packing follower has a cavity to receive a spring and at least a portion of a packing spacer. The apparatus also includes a first aperture disposed on an outer surface of the packing follower extending to the cavity to expose a portion of the spring.

Another apparatus includes a sliding stem fluid valve having a packing follower. A cavity of the packing follower at least partially defines a first aperture and a second aperture positioned on an outer surface of the packing follower. The first aperture is to receive a valve stem and the second aperture is to expose a spring positioned in the cavity. The outer surface is to threadably engage an inner surface of a bonnet of the fluid valve.

Another apparatus includes a packing follower to be threadably coupled to a bonnet of a sliding stem fluid valve. The packing follower is to surround at least a portion of a valve stem and a packing spacer. The apparatus also includes a first recessed area disposed on the packing follower to receive means for adjusting the packing follower. The apparatus also includes a first aperture disposed on or adjacent the first recessed area to expose means for urging the packing follower away from the packing spacer.

A method includes positioning a spring in a cavity of a packing follower. The method also includes threadably coupling the packing follower to a bore of a bonnet of a sliding stem fluid valve. The method also includes adjusting the packing follower based on an appearance the spring to change a load provided to a packing material disposed in the bore. An aperture is positioned on the packing follower to expose at least a portion of the spring.

Figure 1:
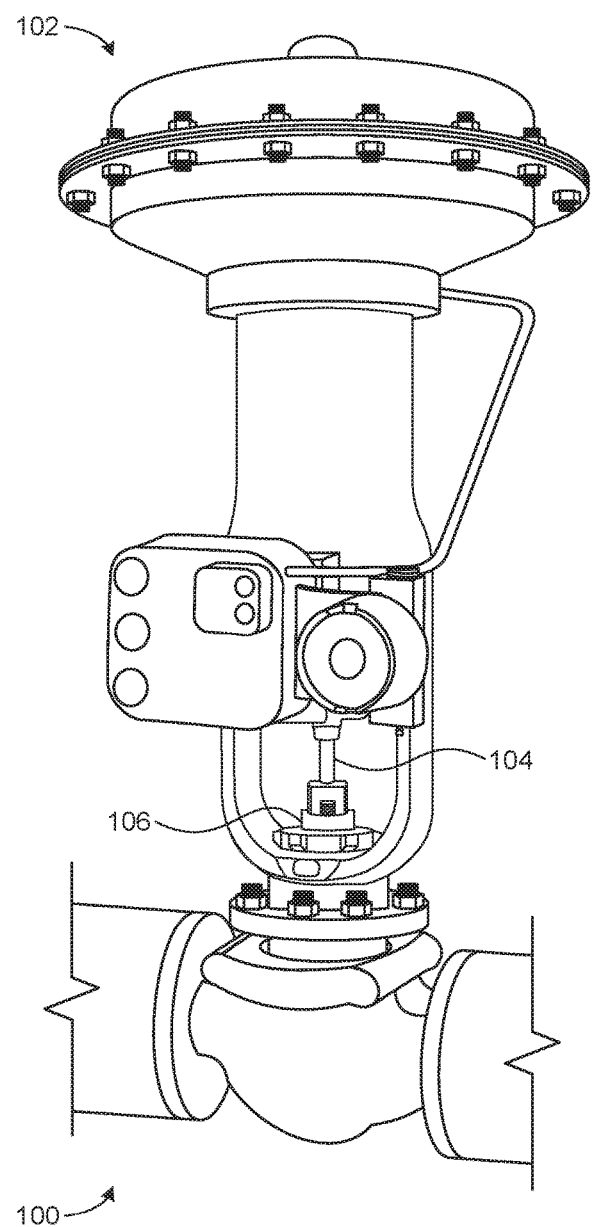
FIG. 1 is a schematic illustration of an example fluid valve that may implement the teachings of this disclosure.

The figures are not to scale. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Fluid control valves may be implemented with valve packing materials that are energized and/or compressed (sometimes referred to as a live-loaded packing) to reduce leaks and/or changes in fluid pressure during normal valve use. For example, a sliding stem fluid valve typically has a valve packing (e.g., a low friction graphite material) positioned in a packing bore or gland of a bonnet surrounding a valve stem. A known packing follower (sometimes referred to as a gland follower) may be positioned in the gland between the valve packing and a packing flange adjustably coupled to the bonnet via fasteners (e.g., one or more packing studs and/or nuts). In particular, to increase or decrease a load provided to the valve packing, the packing flange is adjusted via the fasteners positioned on opposite sides of the packing flange, thereby enabling the packing flange to move toward or away from the bonnet to compress or decompress the packing follower and the valve packing. A spring is typically interposed between the packing follower and the packing flange to provide a relatively constant load to the valve packing as it wears.

To effectively seal the fluid valve and/or utilize the useful life of such a valve packing, the valve packing receives a substantially uniform or even load (e.g., the valve packing is uniformly compressed) generated by the spring and transmitted to the valve packing via the packing follower. However, the fasteners of the above-noted packing flanges are typically adjusted individually by a person (e.g., a valve operator, plant or maintenance personnel, etc.). Such adjustments, however, may cause the packing flange to tilt. As a result, compression of the valve packing may be substantially non-uniform or uneven, for example, due to small differences in the adjustment of the fasteners of the packing flange. Such non-uniform compression of the packing reduces the useful life of the packing and/or may cause the fluid valve to leak process fluid(s), which may adversely affect the environment in which the fluid valve is located and/or incur costs related to valve maintenance and/or repair.

Further, such live-loaded packings may require a minimum requisite load from the spring to effectively seal the fluid valve. As previously mentioned, the valve packing wears during normal valve use, which causes the spring to gradually decompress over a period of time (e.g., 1 year, 2 years, 5 years, etc.). Accordingly, the person may regularly maintain the load generated by the spring (e.g., via adjusting the packing flange) to ensure the valve packing is sufficiently loaded and/or compressed. On the other hand, an excess load generated by the spring may adversely affect the valve packing (e.g., reduce performance and/or the useful life of the valve packing) and/or the fluid valve (e.g., increase downtime and/or incur costs via maintenance). As such, the person may need to identify and/or determine whether the valve packing is properly loaded and/or compressed, for example, by viewing and/or inspecting the spring. However, the above-noted known packing followers may cover (e.g., visually interfere with) the spring, which prevents the person from identifying a compression state of the spring and/or determining whether the valve packing is properly loaded and/or compressed.

Packing apparatus and related methods for use with fluid valves are disclosed herein. Examples disclosed herein reduce and/or prevent improper spring compression (e.g., uneven compression, inadequate compression, and/or excess compression) and/or improper loading exhibited by the above known noted packing flanges and/or packing followers. Examples disclosed herein provide a packing follower for a fluid valve, such as a sliding stem fluid valve, a rotary fluid valve, gate valves, etc. to facilitate a uniform or even load provided to a valve packing material (e.g., graphite, a metallic material, an elastomeric material, polytetrafluoroethylene (PTFE), etc.) to prevent the fluid valve from leaking and/or undesired changes in fluid pressure.

Some disclosed examples enable a person (e.g., a valve operator, plant or maintenance personnel, etc.) to easily adjust the load provided to the packing material while maintaining load uniformity, for example, by rotating the disclosed packing follower via a tool (e.g., a wrench). In some examples, the disclosed packing follower includes a threaded outer surface to threadably and/or removably couple to a bore of a bonnet of the fluid valve. The threaded outer surface enables the disclosed the packing follower to move in a uniform manner (e.g., move without tilting relative to the bonnet) toward or away from the bonnet in response to rotating, thereby uniformly compressing and/or decompressing a spring (e.g., one or more Belleville washers) interposed between the packing follower and the packing material. In such examples, the disclosed packing follower includes one or more recessed areas disposed on the outer surface, where each recessed area defines a substantially flat or level surface to engage the tool for manually adjusting the packing follower. By enabling the disclosed packing follower to couple to the bore in this manner, disclosed examples reduce and/or eliminate non-uniform or uneven compression of the spring and/or the packing material that would have otherwise been caused by using the above noted known packing followers and/or packing flanges. Additionally, the disclosed packing follower reduces the amount of space occupied by the fluid valve and/or a vertical height that would have otherwise been occupied.

Further, some disclosed examples enable the person to visually inspect, determine, and/or verify a compression state of a spring positioned in a cavity of the packing follower, which indicates whether the packing material is properly compressed and/or loaded. In some examples, the disclosed packing follower includes one or more viewing apertures extending through the packing follower to the cavity to expose at least a portion of the spring (e.g., one or more Belleville washers). By exposing the spring, the person is enabled to easily identify and/or determine whether the packing material is properly compressed and/or loaded (e.g., based on a visual appearance of the spring) as well as correct for improper compression and/or loading. For example, the person can identify a gap between a pair of Belleville washers and adjust (e.g., rotates) the packing follower such that the gap satisfies a visual criterion (e.g., a size of the gap is greater than a minimum threshold and less than a maximum threshold). By enabling the person to adjust the disclosed packing follower based on an appearance of the spring, the packing material remains properly loaded and/or compressed (e.g., during normal valve use), which increases the performance of the packing material and/or reduces and/or prevents adverse effects such as leaks in the fluid valve, increased downtime of the fluid valve, and/or increased operating costs that would have otherwise been caused by using the above known noted packing followers and/or packing flanges. Further, in some examples, the person may use another tool (e.g., a feeler gauge) to measure the gap, which enables the person to more accurately determine a size of the gap and, thus, more accurately determine the compression state of the spring and/or the packing material.

FIG. 1 is a schematic illustration of an example fluid valve 100 in which examples disclosed herein may be implemented. In the example of FIG. 1, the fluid valve 100 is a sliding stem fluid valve having an actuator 102 operatively coupled thereto (e.g., via a locknut). However, examples disclosed herein can be implemented in any other suitable fluid valve such as, for example, a rotary fluid valve, a gate valve, etc. In the example of FIG. 1, a valve stem 104 controls a flow of a process fluid (e.g., water, natural gas, oil, etc.) through the fluid valve 100, for example, by causing a valve plug of the fluid valve 100 to move. The valve stem 104 is positioned between the actuator 102 and the fluid valve 100 and extends through a bonnet 106 of the fluid valve 100. In particular, the valve stem 104 moves in and out of the bonnet 106 to open and close the fluid valve 100 (e.g., cause the valve plug to move toward and away from a seat). When the fluid valve 100 of FIG. 1 is closed, the process fluid is substantially prevented from flowing therethrough. Conversely, when the fluid valve 100 is open, the process fluid is enabled to flow therethrough.

To move the valve stem 104, the fluid valve 100 of the illustrated example includes the actuator 102. The actuator 102 of FIG. 1 may be a pneumatic actuator, a hydraulic actuator, an electric actuator, etc. that enables the valve stem 104 to open and close the fluid valve 100. While the actuator 102 of FIG. 1 is depicted as a pneumatic actuator, in other examples, the example fluid valve 100 may be implemented with any other suitable actuator.

Figure 2:
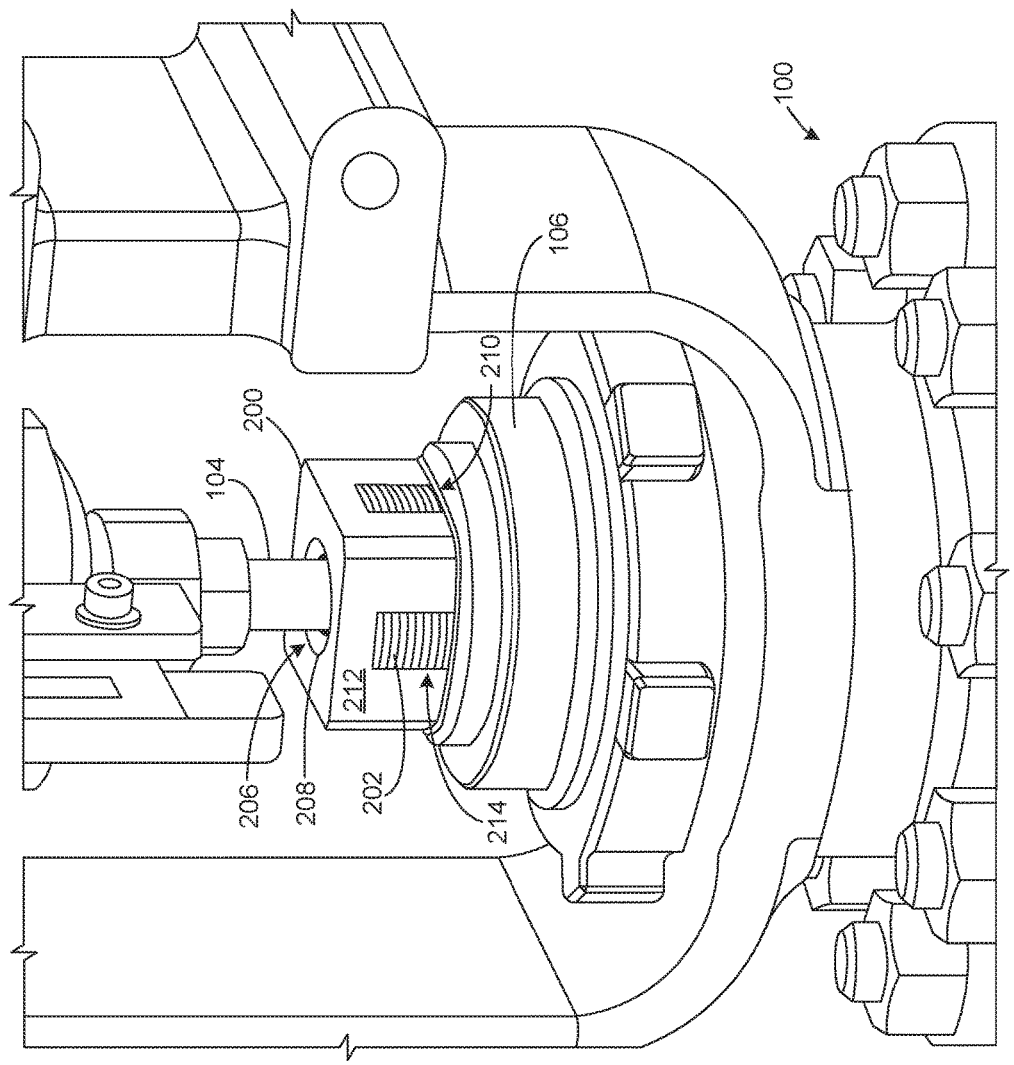
FIG. 2 is an enlarged partial-view of the example fluid valve of FIG. 1 and shows an example packing follower in accordance with examples disclosed herein.

FIG. 2 is an enlarged partial-view of the example fluid valve 100 of FIG. 1 and shows an example packing follower 200 in accordance with examples disclosed herein. While the example packing follower 200 of FIG. 2 is implemented in the fluid valve 100 of FIG. 1, in other examples, the packing follower 200 of FIG. 2 may be implemented in a different fluid valve. The example packing follower 200 of FIG. 2 is removably coupled to the bonnet 106 of the fluid valve 100, for example, via threads. In particular, as discussed further below in connection with FIG. 3, the packing follower 200 may be adjusted (e.g., via rotating relative to the bonnet 106) to move toward and/or away from the bonnet 106 (e.g., in and out of the bonnet 106), thereby adjusting a spring 202 (e.g., changing a compression state of the spring 202) positioned in the bonnet 106 interposed between the packing follower 200 and a valve packing material 314 (shown in FIG. 3). The spring 202 of FIG. 2 generates a load (e.g., in response to being compressed by the packing follower 200) and provides the load to the packing material 314, which enables the packing material 314 to effectively seal the fluid valve 100.

In the example of FIG. 2, the valve stem 104 extends through the packing follower 200 (e.g., extends through the spring 202) as well as the bonnet 106 via a first aperture 206 disposed on the packing follower 200. The first aperture 206 of FIG. 2 includes a chamfered edge 208 adjacent and/or surrounding the valve stem 104, which may facilitate assembly of the fluid valve 100, for example, by enabling a person (e.g., a valve operator, plant or maintenance personnel, etc.) to easily position the valve stem 104 through the first aperture 206 (e.g., during valve installation, valve maintenance, valve repair, etc.). In particular, the stem 104 extends through the above-mentioned packing material 314, which reduces and/or prevents fluid(s) from leaking out of the fluid valve 100 (e.g., between the stem 104 and the bonnet 106) and/or undesired changes in fluid pressure. As disclosed in greater detail below in connection with FIG. 3, to effectively seal the fluid valve 100, the spring 202 provides a specific load to the packing material 314, where the load may be determined based on a visual appearance of the spring 202. Accordingly, at least a portion of the spring 202 is exposed via a second aperture 210 (i.e., a viewing aperture) of the packing follower 200 to enable a valve operator, plant or maintenance personnel, etc. to visually inspect or view the spring 202.

The second aperture 210 of FIG. 2 is disposed on an outer surface 212 of the packing follower 200 and extends through the packing follower 200 (e.g., extends to the spring 202). Additionally or alternatively, in some examples, the example packing follower 200 includes one or more additional apertures disposed on the outer surface 212 to further expose the spring 202. For example, the example packing follower 200 includes a third aperture 214 (i.e., a viewing aperture) adjacent the second aperture 210, as shown in FIG. 2. Further, in some examples, the packing follower 200 includes a fourth aperture 320 (shown in FIG. 3) (i.e., a viewing aperture) adjacent the third aperture 214 and/or opposite the second aperture 210. Further still, in other examples, the packing follower 200 includes a fifth aperture 506 (shown in FIG. 5) (i.e., a viewing aperture) adjacent the fourth aperture 320 and/or opposite the third aperture 214. In some such examples, the apertures 210, 214, 320, 506 have a particular orientation relative to each other, which is disclosed in greater detail below in connection with FIGS. 4 and 5.

Figure 3:
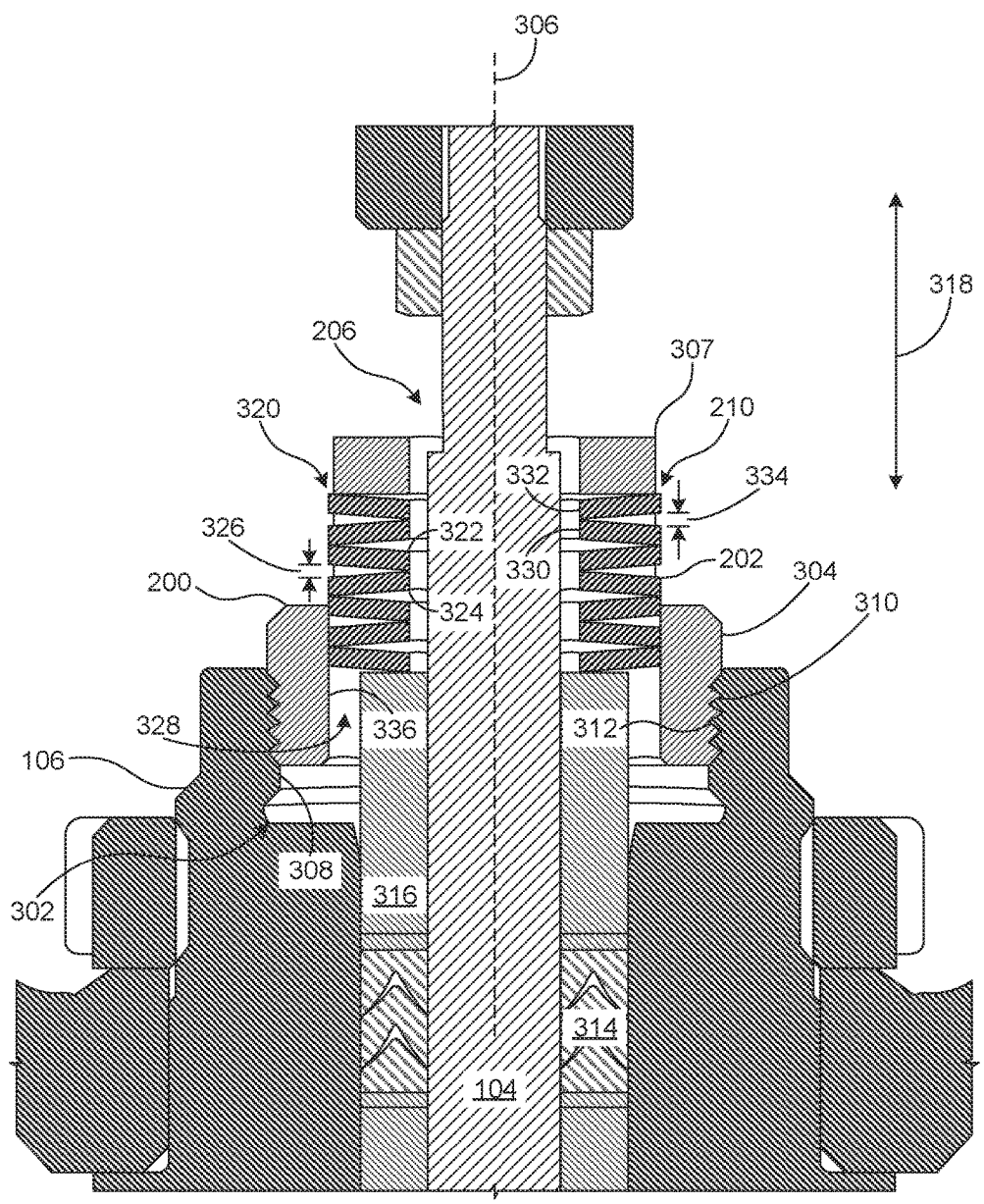
FIG. 3 is a cross-sectional view of the example packing follower of FIG. 2.

FIG. 3 is a cross-sectional view of the example packing follower 200 of FIG. 2 and shows the packing follower 200 threadably coupled to the bonnet 106. As shown in FIG. 3, the packing follower 200 is at least partially positioned in a packing gland and/or bore 302 of the bonnet 106. In this example, a cylindrical portion 304 of the packing follower 200 extends radially outward relative to a central axis 306 of the packing follower 200 and/or the first aperture 206 to engage a wall 308 of the bore 302 of the bonnet 106. The cylindrical portion 304 of FIG. 3 extends along the axis 306 away from a polygonal (e.g., a square) portion 307 for facilitating manual adjustment by the person, which is disclosed in greater detail below in connection with FIG. 5.

As shown in FIG. 3, the packing follower 200 includes threads 310 disposed on an outer surface (e.g., an outer circumferential surface) of the cylindrical portion 304 to matchably engage threads 312 of the wall 308 of the bore 302, thereby threadably and/or removably coupling the example packing follower 200 to the bonnet 106 of the fluid valve 100. In such examples, when rotated, the packing follower 200 moves toward and/or away from the bonnet 106 (e.g., moves in and out of the gland and/or bore 302) to compress and/or the decompress the spring 202. In this manner, the packing follower 200 is used to adjust the load provided to the above disclosed packing material 314 and/or a packing spacer 316 positioned between the packing material 314 and the spring 202. In some examples, as shown in FIG. 3, the packing spacer 316 extends along the valve stem 104 (e.g., the valve stem 104 extends through the packing spacer 316) to enable the packing material 314 to be spaced from the packing follower 200 (e.g., positioned at a depth in the bonnet 106 that would have otherwise been unattainable) while maintaining a uniform load provided to the packing material 314.

According to the illustrated example of FIG. 3, the packing material 314 is positioned in the bore 302 of the bonnet 106 interposed between the valve stem 104 and the wall 308 of the bore 302. For example, the packing material 314 surrounds the valve stem 104 and/or extends along at least a portion of the length of the valve stem 104. The packing material 314 of FIG. 3 includes one or more graphite materials (e.g., a low friction graphite material), metallic materials, elastomeric materials, PTFE, and/or one or more other materials to prevent fluid(s) from leaking out of the fluid valve 100 in response to being energized and/or receiving a load (e.g., via the spring 202). Such materials are sometimes referred to as live-loaded packing.

To facilitate a relatively constant load to the packing material 314 as the packing material wears, means for urging the packing follower 200 away from the packing material 314 is interposed between the packing material 314 and the packing follower 200. In some examples, the means for urging includes the spring 202, as shown in FIG. 3. While the example of FIG. 3 depicts the spring 202 comprising a stack of Belleville washers, in other examples, the means for urging may include one or more different springs (e.g., one or more coil springs) and/or, more generally, one or more biasing elements. However, the Belleville washers have a substantially large spring constant and/or stiffness (e.g., relative to a coil spring). As such, a relatively small deflection of the Belleville washers provides a relatively large force or load. As a result, by implementing the example packing follower 200 and/or the example fluid valve 100 with one or more Belleville washers, space is saved within and/or adjacent the fluid valve 100 (e.g., along the valve stem 104) that may have otherwise been occupied (e.g., by using the coil spring(s)).

In the illustrated example of FIG. 3, the above-mentioned packing spacer 316 is interposed between the packing material 314 and the spring 202 to transmit the load generated by the spring 202 to the packing material 314. In particular, the example packing follower 200 of FIG. 3 surrounds at least a portion (e.g., an uppermost (in the orientation of FIG. 3) portion) of the packing spacer 316, and the valve stem 104 extends through the packing spacer 316. By implementing the example fluid valve 100 with the example packing spacer 316, the packing material 314 is enabled to be uniformly compressed and/or spaced from the spring 202, for example, positioned at a lowermost portion of the valve stem 104 (in the orientation of FIG. 3).

As disclosed above, to increase or decrease the load provided to the example packing material 314, the example packing follower 200 is adjustable (e.g., via a tool). That is, the packing follower 200 moves toward and/or away from the bonnet 106 via the threads 310 of the packing follower 200. For example, the person rotates the packing follower 200 (e.g., via a tool) relative to the bonnet 106 and/or the axis 306, thereby causing the packing follower 200 to move along a direction 318 (e.g., a vertical direction indicated by the double arrow of FIG. 3) without tilting relative to the bonnet 106, the packing spacer 316, and/or the packing material 314. As such, a uniform or even load is provided to the packing material 314 and/or maintained (e.g., the packing material 314 is uniformly loaded and/or compressed) by enabling the packing follower 200 to move in this manner.

To effectively seal the example fluid valve 100, the spring 202 needs to provide a sufficient load to the packing material 314, for example, by adjusting the packing follower 200. On the other hand, an excess load provided by the spring 202 may adversely affect the packing material 314 (e.g., reduce the useful life of the packing material 314). Accordingly, the spring 202 is to be compressed to generate a specific load, which may be visually determined by the person based on an appearance of a compressed state of the spring 202.

As previously mentioned, to facilitate visual inspection, the example packing follower 200 includes one or more of the above disclosed second aperture 210, the third aperture 214 (not shown), the fourth aperture 320, and/or the fifth aperture 506 (shown in FIG. 5) to expose at least a portion of the spring 202. As such, the person can easily view the spring 202 via the aperture(s) 210, 214, 320, 506 to determine whether the packing follower 200 should be adjusted to change the compression imparted on the packing material 314. In particular, when the spring 202 is a stack of Belleville washers (shown in FIG. 3), a first pair of adjacent washers 322, 324 of the spring 202 form a first gap 326 therebetween. The first gap 326 indicates a compression state of the spring 202 and/or the load provided to the packing material 314. Thus, the load provided to the packing material 314 can be adjusted (e.g., via rotating the packing follower 200) based on the appearance of the spring 202 and, more specifically, based on a size of the first gap 326 between the washers 322, 324. In other examples, the spring 202 may be a one or more coil springs. Similarly, in such examples, the load provided to the packing material 314 is likewise indicated by a gap formed by adjacent coils of the coil spring(s). Accordingly, in such examples, the person may likewise adjust the load based on an appearance of the coil spring(s) (e.g., based on a size of the gap between the adjacent coils).

In the example of FIG. 3, the spring 202 is positioned in a cavity 328 of the packing follower 200. Additionally, in this example, the packing spacer 316 is partially positioned in the cavity 328 of the packing follower 200. As shown in FIG. 3, the spring 202 partially extends out of the second aperture 210 and/or the fourth aperture 320, which further exposes the spring 202 and/or the first gap 326 formed between the first pair of adjacent washers 322, 324 of the spring 202. As shown in FIG. 3, one or more of the apertures 210, 214, 320, and/or 506 of the packing follower 200 may be sized to expose more than one pair of washers of the spring 202. In the example of FIG. 3, the second aperture 210 and the fourth aperture 320 of the packing follower 200 are sized such that the first pair of washers 322, 324 as well as a second pair of washer 330, 332 of the spring 202 are exposed. As such, the first gap 326 formed between the first pair of washers 322, 324 is exposed as well as a second gap 334 formed between the second pair of washers 330, 332. In such examples, by exposing more than one pair of washers of the spring 202, the example packing follower 200 may be adjusted based on a visual appearance of the first gap 326 as well as the second gap 334 (and/or one or more gaps formed between other pairs of washers), which better enables the person to identify and/or determine a compression state of the spring 202 and/or the load provided therefrom. In some examples, a first tool (e.g., a feeler gauge) is used to measure the first gap 326 and/or the second gap 334, which may provide for a more accurate determination of a size of each gap 326, 334.

To further facilitate viewing the spring 202, in some examples, one or more of the apertures 210, 214, 320, 506 include a particular shape or geometry (e.g., an irregular or regular polygon). For example, one or more (e.g., each) of the apertures 210, 214, 320, 506 may have a shape that is substantially rectangular, square, triangular, circular, etc. In some examples, one or more of the apertures 210, 214, 320, 506 include a shape that is substantially rectangular, which may be cost effective to manufacture and/or provides for a greater viewing area while maintaining structural integrity of the packing follower 200 that would have otherwise been unattainable using one or more different shapes (e.g., a circle, a triangle, etc.).

In the examples of FIG. 3, the cavity 328 of the packing follower 200 includes a wall 336 sized to receive the spring 202. In particular, the wall 336 of the cavity 328 of FIG. 3 defines a circumferential surface to engage a peripheral edge of the spring 202 (e.g., a circumferential edge of one or more of the washers 322, 324, 330, 332). In such examples, the wall 336 of the cavity 328 aligns the spring 202 (e.g., one or more of the washers 322, 324, 330, 332 and/or one or more spring coils) and/or maintains the alignment, for example, when adjusting the packing follower 200, during valve assembly, valve operation, valve maintenance, etc.

Figure 4:
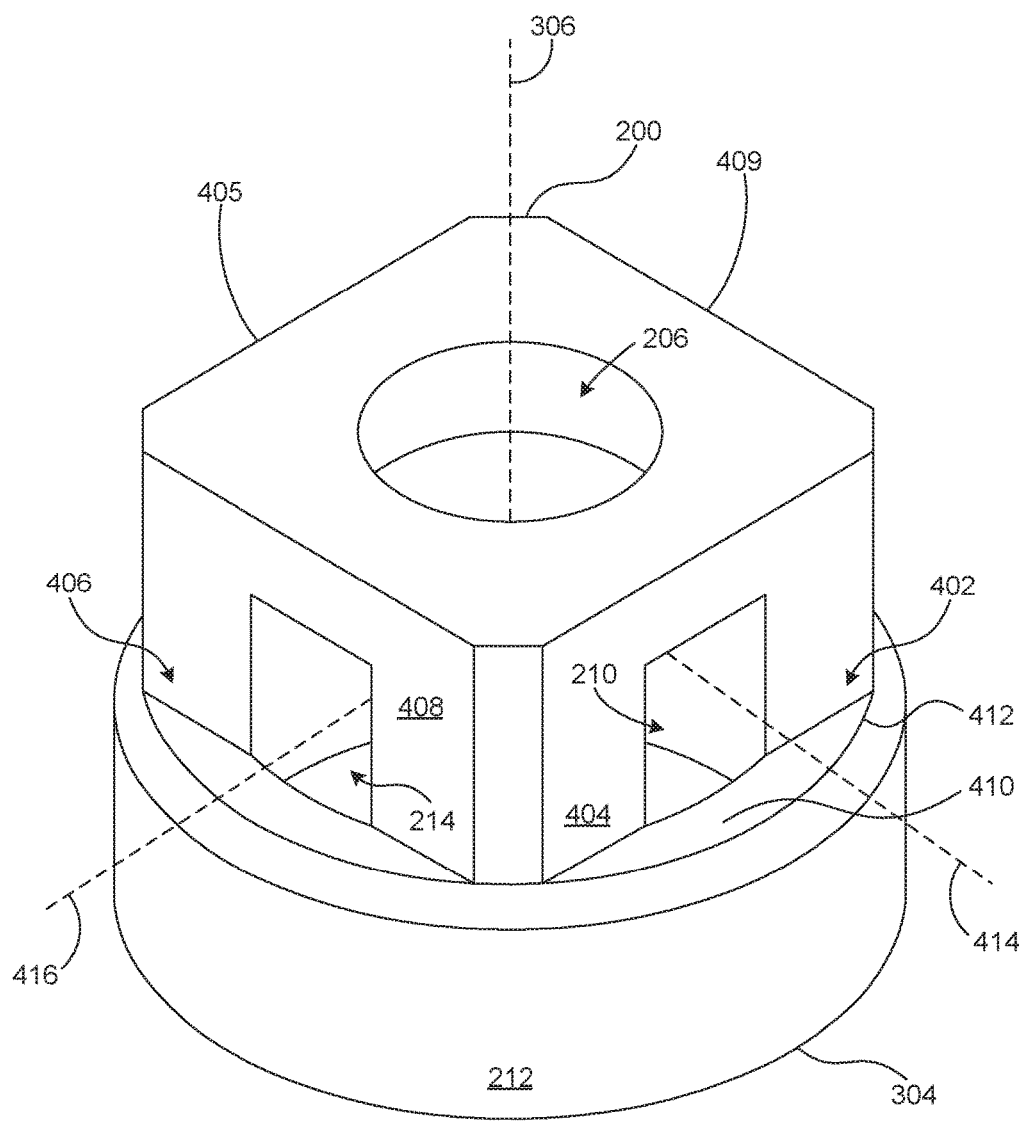
FIG. 4 is a detailed isometric view of the example packing follower of FIG. 2.

FIG. 4 is a detailed isometric view of the example packing follower 200 of FIG. 2. The example packing follower 200 of FIG. 4 includes a first recess 402 disposed on the outer surface 212 to receive means for adjusting the packing follower 200. For example, the first recess 402 defines a first recessed area (e.g., a flat or level area) 404 of the packing follower 200 to engage a portion of a second tool (e.g., a first jaw of a wrench). In such examples, to enable the second tool to effectively engage, grip, and/or clamp the packing follower 200, the example packing follower 200 includes a second recess 502 (shown in FIG. 5) disposed on the outer surface 212 of the packing follower 200, opposite the first recess 402, to likewise define a second recessed area 405 (e.g., a flat or level area) for engaging another portion the second tool (e.g., a second jaw of a wrench). In such examples, the first recessed area 404 and the second recessed area 405 are substantially parallel relative to each other. That is, a plane defined by the first recessed area 404 and a plane defined by the second recessed area 405 form an angle between about −5 degrees and 5 degrees, which enables the second tool (e.g., the wrench) to easily engage the packing follower 200 and/or provide a torque thereto (e.g., generated by the person).

While the example of FIG. 4 depicts the means for adjusting the example packing follower 200 to be a wrench (e.g., an open-end wrench, box end wrench, an adjustable wrench, a pipe wrench, etc.), in other examples, the means for adjusting includes one or more other tools for adjusting the packing follower 200, such as pliers, a socket, etc.

Additionally or alternatively, in some examples, the example packing follower 200 includes a third recess 406 disposed on the outer surface 212 to receive the means for adjusting the packing follower 200, as shown in FIG. 4. For example, the third recess 406 defines a third recessed area (e.g., a flat or level area) 408 of the packing follower 200 to engage the second tool. In the example of FIG. 4, the third recessed area 408 of the packing follower 200 is adjacent the first recessed area 404 (and/or the second recessed area 405). In such examples, the third recessed area 408 and the first recessed area 404 (and/or the second recessed area 405) are substantially perpendicular relative to each other. That is, a plane defined by the third recessed area 408 and a plane defined by the first recessed area 404 form an angle between about 85 degrees and 95 degrees. Additionally, in some examples, the example packing follower 200 includes a fourth recess 504 (shown in FIG. 5) disposed on the outer surface 212, opposite the third recess 406, to likewise define a fourth recessed area 409 (e.g., a flat or level area) for engaging the second tool. In such examples, similar to the first recessed area 404 and the second recessed area 405, the third recessed area 408 and the fourth recessed area 409 defined by the fourth recess 504 may be substantially parallel relative to each other.

As shown in FIG. 4, the first recessed area 404 of the packing follower 200 at least partially surrounds and/or defines the second aperture 210. Similarly, in the example of FIG. 4, the third recessed area 408 of the packing follower 200 at least partially surrounds and/or defines the third aperture 214. In other examples, the first recessed area 404 defines the entire second aperture 210, and the third recessed area 408 defines the entire third aperture 214. Further, although not shown in FIG. 4, the second recessed area 405 of the packing follower 200 likewise defines at least a portion of the fourth aperture 320 (e.g., the entire fourth aperture 320), and/or the fourth recessed area 409 of the packing follower 200 likewise defines at least a portion of the fifth aperture 506 (e.g., the entire fifth aperture 506).

In the example of FIG. 4, the cylindrical portion 304 of the packing follower 200 partially defines the second aperture 210. As shown in FIG. 4, an uppermost (in the orientation of FIG. 4) flat surface 410 of the cylindrical portion 304 at least partially defines the second aperture 210. The flat surface 410 of the cylindrical portion 304 is adjacent a peripheral edge (e.g., a chamfered edge) 412 of the packing follower 200. Similarly, in some examples, the cylindrical portion 304 of the packing follower 200 likewise partially defines one or more of the third aperture 214, the fourth aperture 320, and/or the fifth aperture 506 of the packing follower 200, as disclosed further below in connection with FIG. 5.

In the example of FIG. 4, the central axis 306 of the first aperture 206 of the packing follower 200 is substantially perpendicular relative to a central axis 414 of the second aperture 210. That is, both of the axes 306, 414 form an angle between about 85 degrees and 95 degrees. Similarly, in the example of FIG. 4, a central axis 416 of the third aperture 214 of the packing follower 200 is substantially perpendicular relative to the axis 306 of the first aperture 206 and/or the axis 414 of the second aperture 210.

Figure 5:
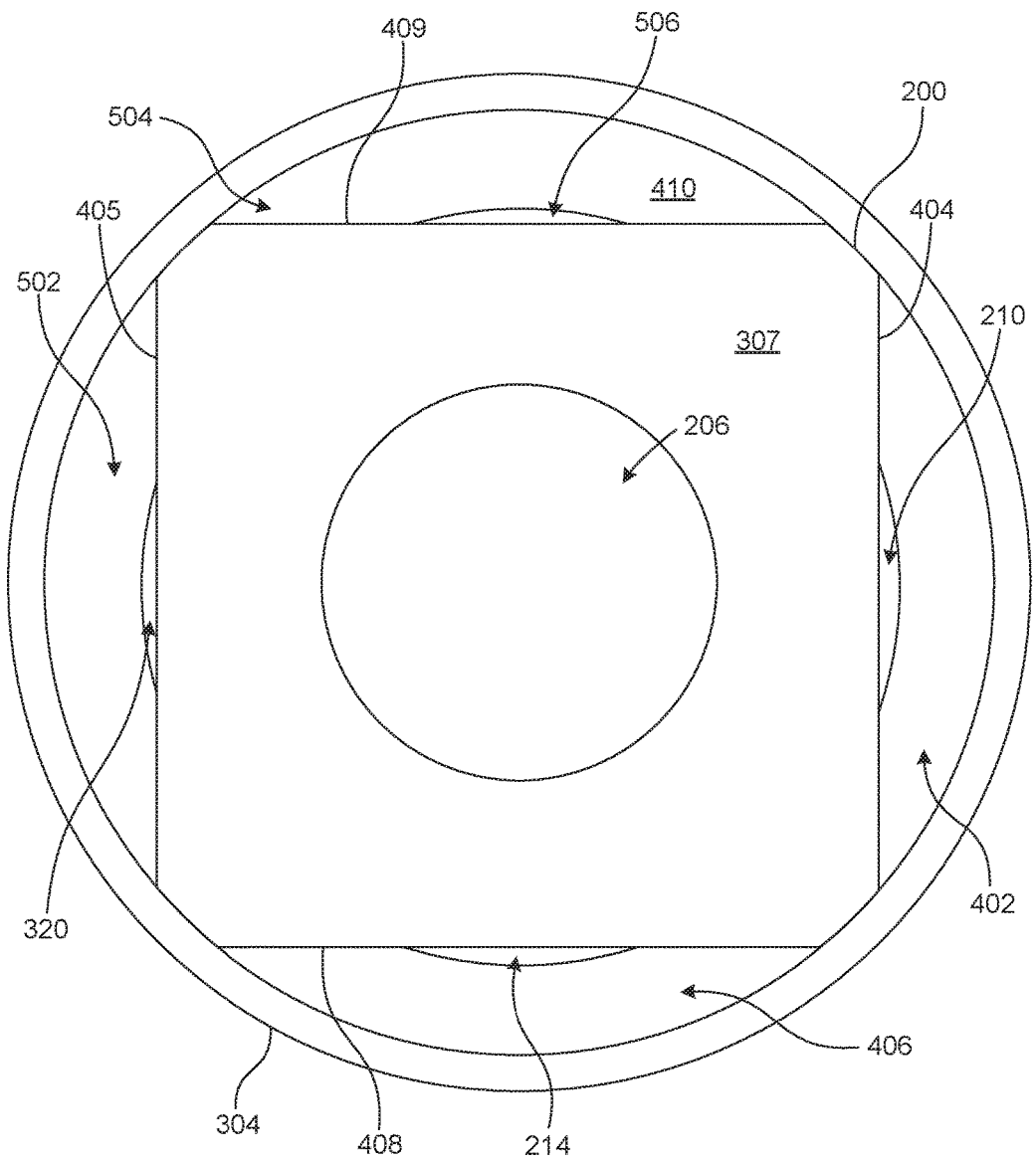
FIG. 5 is a detailed top view of the example packing follower of FIG. 2.

FIG. 5 is a detailed top-view of the example packing follower 200 of FIG. 2 and shows the above mentioned first recess 402, the second recess 502, the third recess 406, and the fourth recess 504 of the packing follower 200. As shown in FIG. 5, the second recess 502 is opposite the first recess 402, and the fourth recess 504 is opposite the third recess 406. In the example of FIG. 5, the flat surface 410 of the cylindrical portion 304 of the example packing follower 200 is defined by the first recess 402, the second recess 502, the third recess 406, and/or the fourth recess 504 of the packing follower 200. Additionally, as mentioned above, the flat surface 410 of the cylindrical portion 304 partially defines one or more (e.g., each) of the above disclosed viewing apertures 210, 214, 320, 506, which is shown in FIG. 5.

As shown in FIG. 5, the example packing follower 200 includes the above disclosed polygonal portion 307 for facilitating manual adjustment by the person. The polygonal portion 307 of FIG. 5 extends away relative to the flat surface 410 of the cylindrical portion 304, for example, along the central axis 306 of the first aperture 206. The polygonal portion 307 of FIG. 5 is substantially formed by the first recess 402, the second recess 502, the third recess 406, and the fourth recess 504. While the example packing follower 200 of FIG. 5 is depicted having the polygonal portion 307 and/or the first recessed area 404 defined by the first recess 402, the second recessed area 405 defined by the second recess 502, the third recessed area 408 defined by the third recess 406, and the fourth recessed area 409 defined by the fourth recess 504, in other examples, the packing follower 200 may include a differently shaped portion (e.g., an irregular or regular polygon such as a triangle, a pentagon, a hexagon, etc.) for facilitating manual adjustment by the person and/or additional or fewer recesses and respective recessed areas.

However, the size of the viewing apertures 210, 214, 320, 506 of the packing follower 200 may be limited when the packing follower 200 is implemented with additional recesses and recessed areas and/or a shaped portion having more sides than a square (e.g., a hexagon). Additionally, certain tools may not effectively engage, grip, and/or clamp the example packing follower 200 when implemented with fewer than four recesses and/or a shaped portion having less than four sides, which may prevent the person from easily adjusting the packing follower 200.

Figure 6:
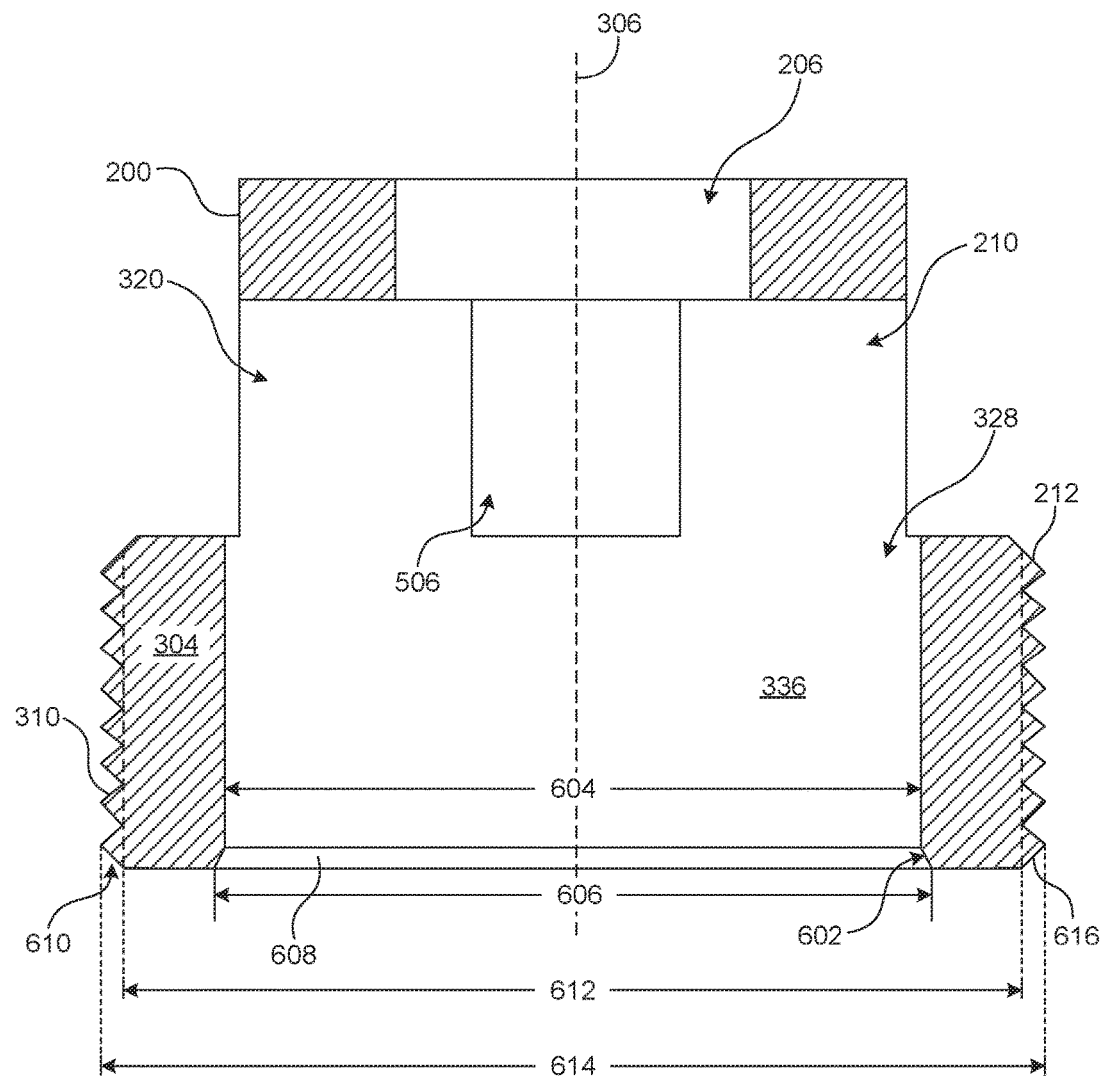
FIG. 6 is another cross-sectional view of the example packing follower of FIG. 2.

FIG. 6 is another cross-sectional view of the example packing follower 200 of FIG. 2 and shows a first chamfer 602 disposed on a lowermost (in the orientation of FIG. 6) portion of the packing follower 200 to receive and/or guide the spring 202, for example, when the spring 202 passes into the cavity 328 (e.g., during valve assembly, maintenance, repair, etc.). In particular, the wall 336 of the cavity 328 includes the first chamfer 602. As such, the wall 336 of the cavity 328 defines a first inner diameter 604 of the packing follower 200, and the first chamfer 602 defines a second inner diameter 606 greater than the first inner diameter 604.

The first chamfer 602 of FIG. 6 includes a substantially flat and/or angled surface 608 extending from the lowermost (in the orientation of FIG. 6) portion of the wall 336 of the cavity 328 to the lowermost (in the orientation of FIG. 6) portion of the first chamfer 602, which further facilitates the positioning of the spring 202 into the cavity 328. Stated differently, the angled surface 608 of the first chamfer 602 faces radially inward relative to the central axis 306 of the first aperture 206 of the packing follower 200 (e.g., the first chamfer 602 faces the spring 202). In some examples, the first chamfer 602 may define a curved surface facing radially inward relative to the axis 306 of the first aperture 206.

In the example of FIG. 6, a second chamfer 610 is disposed on the lowermost (in the orientation of FIG. 6) portion of the outer surface 212 of the packing follower 200 such that the second chamfer 610 is concentric relative to the first chamfer 602. The second chamfer 610 of the packing follower 200 is to be received by the bore 302 of the bonnet 106 and/or guides the packing follower 200, for example, when the packing follower 200 is positioned in the bore 302 (e.g., during valve assembly, maintenance, repair, etc.). In particular, the second chamfer 610 is disposed on the cylindrical portion 304 of the packing follower 200 (e.g., adjacent the threads 310). As such, the second chamfer 610 defines a first outer diameter 612 of the packing follower 200 smaller than a second outer diameter 614 defined by a circumferential surface of the cylindrical portion 304.

The second chamfer 610 of FIG. 6 includes a substantially flat and/or angled surface 616 extending from the lowermost (in the orientation of FIG. 6) portion of the second chamfer 610 to the lowermost (in the orientation of FIG. 6) portion of the circumferential surface of the cylindrical portion 304, which facilitates the positioning of the packing follower into the bore 302 of the bonnet 106. Stated differently, the angled surface 616 of the second chamfer 610 faces radially outward relative to the central axis 306 of the first aperture 206 of the packing follower 200 (e.g., the second chamfer 610 faces the wall 308 of the bore 302 of the bonnet 106). In some examples, the second chamfer 610 may define a curved surface facing radially outward relative to the axis 306 of the first aperture 206.

As shown in FIG. 6, the cavity 328 of the packing follower 200 at least partially defines one or more of the first aperture 206, the second aperture 210, the third aperture 214, the fourth aperture 320, and/or the fifth aperture 506.

Figure 7:
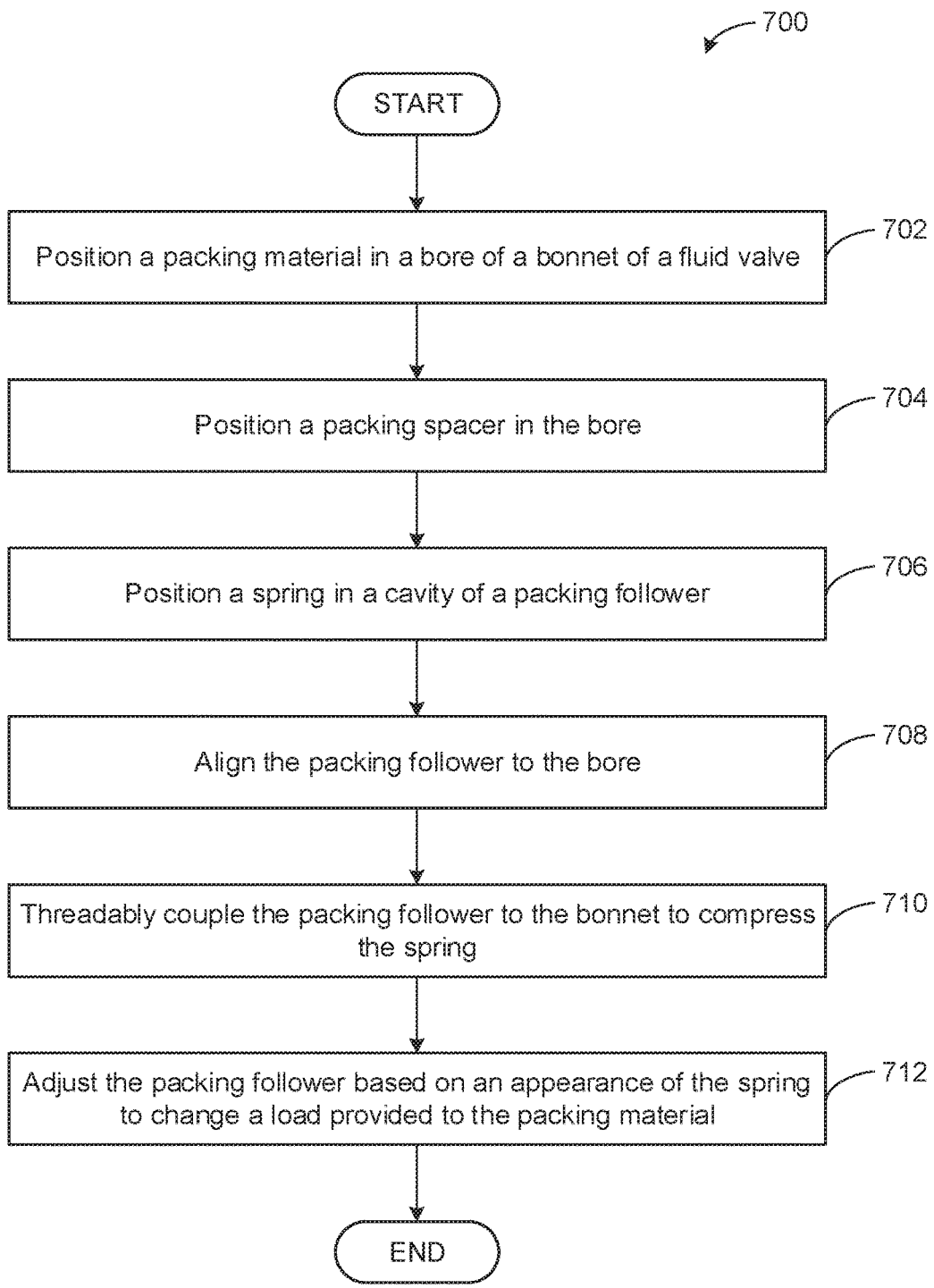
FIG. 7 is a flow diagram of an example method that can be used to implement the example fluid valve of FIG. 1 and/or the example packing follower of FIGS. 2-6.

FIG. 7 is a flow diagram of an example method 700 that can be used to implement the example fluid valve 100 of FIGS. 1-3 and/or the example packing follower 200 of FIGS. 2-6. The example method 700 may be implemented to seal the example fluid valve 100 (and/or one or more other fluid valves), which reduces and/or prevents the fluid valve 100 from leaking and/or undesired changes in fluid pressure. The example method 700 begins by positioning a packing material in a bore of a bonnet of a fluid valve (block 702). In some examples, the example packing material 314 of FIG. 3 is positioned in the gland and/or bore 302 of the bonnet 106, for example, before and/or after the valve stem 104 passes through bore 302. As previously mentioned, the packing material 314 reduces and/or prevents the fluid valve 100 from leaking process fluid(s) and/or undesired changes in fluid pressure, for example, when loaded and/or compressed via the example packing follower 200 and/or the spring 202. In particular, the packing material 314 is interposed between the valve stem 104 and the wall 308 of the bore 302 such that the packing material 314 surrounds the valve stem 104 and/or extends along a portion of its length. To effectively seal the fluid valve 100, the packing material 314 requires a specific load generated by the spring 202, which may be visually determined (e.g., by the person) based on an appearance of the spring 202, as discussed below.

The example method 700 includes positioning a packing spacer in the bore (block 704). In some examples, the packing spacer 316 of FIG. 3 is positioned in the bore 302 (e.g., positioned on and/or surrounding the valve stem 104) on and/or adjacent the packing material 314. In such examples, the packing spacer 316 enables the packing material 314 to be spaced from the spring 202 and/or the packing follower 200 as well as facilitates a uniform compression of the packing material 314 (e.g., by providing a uniform load to the packing material 314 from the spring 202).

The example method 700 includes positioning a spring in a cavity of a packing follower (block 706). In some examples, the example spring 202 of FIGS. 2 and 3 is positioned in the cavity 328 of the example packing follower 200. As previously mentioned, the spring 202 provides a load to the packing material 314 and/or otherwise compresses the packing material 314 (e.g., via adjusting the packing follower 200), for example, when the packing follower 200 is threadably coupled to the bonnet 106. Further, in some examples, at least a portion of the packing spacer 316 is positioned in the cavity 328 of the packing follower 200 to transmit the load generated by the spring 202 to the packing material 314.

In some examples, the cavity 328 of the packing follower 200 guides and/or aligns the spring 202 (e.g., one or more of the washers 322, 324, 330, 332 and/or one or more coils) when the spring 202 passes into the cavity 328, which facilitates valve installation, valve assembly, valve maintenance, etc. For example, the wall (e.g., a circumferential wall) 336 of the cavity 328 engages the peripheral edge(s) of the spring 202, for example, to cause circumferential edges of the washers 322, 324, 330, 332 to align relative to each other.

The example method 700 also includes aligning the packing follower to the bore 302 (block 708). In some examples, the example packing follower 200 of FIGS. 2-6 is positioned over and/or in the bore 302 of the bonnet 106 such that at least a portion (e.g., the cylindrical portion 304) of the packing follower 200 engages the wall 308 of the bore 302. For example, the threads 310 of the packing follower 200 are adjacent, proximate, and/or engaging the threads 312 of the wall 308 of the bore 302.

The example method 700 also includes threadably coupling the packing follower to the bonnet to compress the spring (block 710). In some examples, the example packing follower 200 of FIGS. 2-6 is threadably coupled to the bonnet 106 of the fluid valve 100 via the threads 310 disposed on the outer surface 212 of the packing follower 200. For example, the threads 310 of the packing follower 200 engage the threads 312 of the bore 302. In some examples, the person uses the second tool (e.g., a wrench) to rotate the packing follower 200 relative to the bonnet 106 to enable the packing follower to move toward the bonnet 106 and couple thereto, which may compress the spring 202 (e.g., between the packing follower 200 and the packing spacer 316). In a similar manner, the person may use the second tool to adjust the packing follower 200 to change a compression of the spring 202, thereby adjusting and/or otherwise changing the load provided to packing material 314, as discussed below. By enabling the packing follower 200 to threadably couple to the bonnet 106 in this manner, the packing material 314 receives a uniform load generated by the spring 202 (e.g., transmitted to the packing material 314 via the packing spacer 316) when the spring 202 is compressed.

The example method 700 also includes adjusting the packing follower 200 based on an appearance of the spring to change a load provided to the packing material (block 712). In some examples, the person uses the second tool to rotate the example packing follower 200 of FIGS. 2-6 relative to the bonnet 106, thereby causing the packing follower 200 to move toward and/or away from bonnet 106 (e.g., move in and out of the bore 302 substantially along the direction 318) while maintaining a relative orientation of the packing follower 200 (e.g., the packing follower 200 moves without tilting). Stated differently, the packing follower 200 moves relative to the bonnet 106 without tilting relative to the bonnet 106, which maintains a uniform load provided to the packing material 314 (e.g., maintains uniform compression of the packing material 314) as the packing follower 200 is adjusted. In response to the packing follower 200 moving relative to the bonnet 106, a compression state of the spring 202 changes. For example, the spring 202 compresses as the packing follower 200 moves toward the bonnet 106 and decompresses as the packing follower 200 moves away from the bonnet 106. As a result, the load provided to the packing material 314 from the spring 202 likewise increases or decreases in response to the packing follower 200 moving relative to the bonnet 106.

As previously mentioned, to effectively seal the fluid valve 100, the packing material 314 requires a specific load generated by the spring 202, where the load may be visually determined based on an appearance of the spring 202. For example, the one or more gaps 326, 334 formed by the one or more washers (i.e., one or more Bellville washers) 322, 324, 330, 332 indicate the load generated by the spring 202. As such, the person adjusts the packing follower 200 (e.g., rotates the packing follower 200 clockwise or counterclockwise) until a size of at least one of the gaps 326, 334 decreases or increases to satisfy a visual criterion. For example, the person may determine the packing material 314 is properly loaded when the at least one of the gaps 326, 334 is larger than a minimum threshold gap (e.g., to ensure the packing material 314 is sufficiently loaded and/or compressed) and smaller than a maximum threshold gap (e.g., to ensure the packing material 314 is not excessively loaded and/or compressed). To enable the person to view and/or inspect the spring 202, the packing follower 200 includes one or more of the apertures 210, 214, 320, 506 to expose at least a portion of the spring 202 (e.g., the washer(s) 322, 324, 330, 332 and/or the gaps 326, 334).

In some examples, the person may adjust the packing follower 200 while viewing the spring 202. For example, the person looks though the second aperture 210 while a first jaw of a wrench engages the third recessed area 408 of the packing follower 200 and a second jaw of the wrench engages the fourth recessed area 409 of the packing follower 200. In other examples, the person may alternate between viewing the appearance of the spring 202 and adjusting the packing follower 200. For example, the person may first identify an appearance of the spring 202 via one or more of the apertures 210, 214, 320, 506 and then rotate the packing follower 200 by an increment (e.g., a quarter rotation or revolution, a half rotation or revolution, etc.). The person may repeat viewing the spring 202 and adjusting the packing follower 200 based on the appearance of the spring 202 in this manner until the appearance satisfies the visual criterion.

Although the example packing follower 200 and/or the example fluid valve 100 is described with reference to the flowchart illustrated in FIG. 7, any other method of implementing the packing follower 200 and/or the fluid valve 100 may alternatively be used. For example, the order of execution of the blocks of FIG. 7 may be combined and/or some of the blocks described may be changed, eliminated, or additional blocks may be added. The example method 700 shown in FIG. 7 is only one example method describing the implementation of the packing follower 200 and/or the fluid valve.

As used herein, the terms "including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

From the foregoing, it will be appreciated that packing apparatus and related methods for use with fluid valves have been disclosed that reduce and/or prevent improper spring compression (e.g., uneven compression, inadequate compression, and/or excess compression) and/or improper loading for a valve packing material exhibited by known packing flanges and/or packing followers, for example, caused by user error(s) and/or misjudgment. Some examples enable a person to easily adjust (e.g., increase or decrease) a load provided to the packing material while maintaining load uniformity. Further, some disclosed examples enable the person to visually inspect, determine, and/or verify a compression state of the spring positioned in a cavity of an example packing follower, which indicates whether the packing material is properly compressed and/or loaded. By enabling the person to adjust compression of the spring and/or the packing material based on a visual appearance of the spring, the packing material remains properly loaded and/or compressed (e.g., during normal valve use), which increases the performance of the packing material and/or reduces and/or prevents adverse effects (e.g., leaks in the fluid valve, increased downtime of the fluid valve, and/or increased operating costs) that would have otherwise been caused by using known packing followers and/or packing flanges.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   positioning a spring in a cavity extending through a lower portion of a packing follower and into an upper portion of the packing follower, the lower portion having an outer cylindrical profile having a threaded surface and the an upper portion having a first planar surface perpendicular to a longitudinal axis of the packing follower and a second planar surface parallel to the longitudinal axis, the second planar surface connected to the first planar surface to form a recess on a top surface of the cylindrical profile, and a first aperture along the longitudinal axis disposed in the first planar surface to receive a valve stem;
   threadably coupling the lower portion of the packing follower to a bore of a bonnet of a fluid valve; and
   adjusting the packing follower based on an appearance of the spring to change a load provided to a packing material disposed in the bore, a second aperture positioned in the second planar surface of the upper portion of the packing follower to expose a peripheral portion of the spring.

2. The method of claim 1, wherein adjusting the packing follower includes rotating, via a tool, the packing follower relative to the bore of the bonnet, the tool to engage the recess disposed on the top surface of the cylindrical profile.

3. The method of claim 1, wherein the spring includes a first washer and a second washer, and wherein adjusting the packing follower includes decreasing a gap between the first washer and second washer until the gap satisfies a visual criterion.

4. An apparatus comprising:
   a packing follower for a fluid control valve, the packing follower having a first aperture along a longitudinal axis of the packing follower to receive a valve stem, a lower portion having an outer cylindrical profile having a threaded surface, an upper portion having a first planar surface perpendicular to the longitudinal axis and a second planar surface parallel to the longitudinal axis, the second planar surface connected to the first planar surface to form a recess on a top surface of the cylindrical profile, and a cavity extending through the lower portion and into the upper portion to receive at least a portion of a packing spacer;
a plurality of springs disposed in the cavity; and
a second aperture disposed in the second planar surface of the upper portion of the packing follower extending to the cavity to expose a peripheral portion of the plurality of springs.

5. The apparatus of claim 4, wherein the packing follower removably couples to a portion of a bonnet of the valve, the packing follower to be partially disposed in the bonnet.

6. The apparatus of claim 4, wherein the recess disposed on the top surface of the cylindrical profile is to receive a tool for adjusting the packing follower.

7. The apparatus of claim 6, wherein the recess at least partially surrounds the second aperture.

8. The apparatus of claim 4, further comprising the packing spacer, wherein the plurality of springs is positioned between the packing follower and the packing spacer.

9. The apparatus of claim 4, wherein the packing follower includes a third aperture, opposite the second aperture, extending to the cavity, the plurality of springs to be positioned between the second aperture and the third aperture.

10. The apparatus of claim 4, wherein the plurality of springs include Belleville washers.

11. The apparatus of claim 10, wherein the cavity includes a circumferential surface to receive the Belleville washers.

12. The apparatus of claim 1, wherein an edge between the top surface and the threaded surface of the lower portion is a chamfered edge.

13. The apparatus of claim 1, wherein the lower portion includes an inner circumferential surface and a bottom surface, the inner circumferential surface having a chamfered edge between the inner circumferential surface and the bottom surface.

14. The apparatus of claim 13, wherein a first end of the chamfered edge in contact with the inner circumferential surface defines a first inner diameter of the lower portion and a second end of the chamfered edge in contact with the bottom surface defines a second inner diameter, the first inner diameter less than the second inner diameter.

15. An apparatus comprising:
a fluid control valve having a packing follower, a cavity extending through a lower portion of the packing follower and into an upper portion of the packing follower, the cavity at least partially defining a first aperture along a longitudinal axis of the packing follower and disposed in a first planar surface of the upper portion, the first planar surface perpendicular to the longitudinal axis, and a second aperture positioned on a second planar surface of the upper portion parallel to the longitudinal axis, the first aperture to receive a valve stem and the second aperture to expose a peripheral portion of a plurality of springs positioned in the cavity, wherein the lower portion has an outer cylindrical profile having a threaded outer surface, the threaded outer surface of the lower portion to threadably engage an inner surface of a bonnet of the fluid valve, and wherein the first planar surface is connected to the second planar surface to form a recess on a top surface of the cylindrical profile.

16. The apparatus of claim 15, wherein a central axis of the first aperture is the longitudinal axis and the central axis of the first aperture is substantially perpendicular relative to a central axis of the second aperture.

17. The apparatus of claim 16, wherein the cavity further defines a third aperture positioned adjacent the first aperture and the second aperture to further expose the plurality of springs, a central axis of the third aperture substantially perpendicular relative to the central axis of the first aperture and the central axis of the second aperture.

18. The apparatus of claim 15, wherein the recess is to receive means for adjusting the packing follower.

19. The apparatus of claim 15, wherein the cavity includes a circumferential wall to engage a peripheral edge of the plurality of springs.

20. The apparatus of claim 15, wherein the plurality of springs is to be positioned between the first aperture and the second aperture.

21. An apparatus comprising:
a packing follower to be threadably coupled to a bonnet of a fluid control valve, the packing follower having a first aperture along a longitudinal axis of the packing follower disposed in a first planar surface of an upper portion of the packing follower perpendicular to the longitudinal axis to surround at least a portion of a valve stem and a packing spacer and a second planar surface parallel to the longitudinal axis, wherein the packing follower includes a lower portion having an outer cylindrical profile having a threaded surface and extending radially outward from the second planar surface of the upper portion and a cavity extending through the lower portion and into the upper portion;
a first recessed area formed on a top surface of the cylindrical profile where the first planar surface connects to the second planar surface to receive means for adjusting the packing follower; and
a second aperture disposed in the second planar surface to expose an outer portion of means for urging the packing follower away from the packing spacer.

22. The apparatus of claim 21, further including a second recessed area, different from the first recessed area, disposed on the packing follower to receive the means for adjusting.

23. The apparatus of claim 22, wherein the first recessed area and the second recessed area of the packing follower are substantially flat and perpendicular relative to each other.

24. The apparatus of claim 22, wherein a third aperture is disposed on or adjacent the second recessed area to further expose the means for urging.

25. The apparatus of claim 24, wherein a portion of the means for urging is to be positioned between the second aperture and the third aperture.

* * * * *